(No Model.)

W. J. SUTTIE.
Nose Piece for Eyeglasses.

No. 237,213.  Patented Feb. 1, 1881.

WITNESSES:
A. Schehl.
C. Sedgwick

INVENTOR:
W. J. Suttie
BY Munn & Co
ATTORNEYS.

UNITED STATES PATENT OFFICE.

WILLIAM J. SUTTIE, OF NEW YORK, N. Y.

NOSE-PIECE FOR EYEGLASSES.

SPECIFICATION forming part of Letters Patent No. 237,213, dated February 1, 1881.

Application filed July 3, 1880. (No model.)

*To all whom it may concern:*

Be it known that I, WILLIAM J. SUTTIE, of the city, county, and State of New York, have invented a new and Improved Nose-Piece for Eyeglasses, of which the following is a specification.

The object of this invention is to provide an improved device for holding the glasses and supporting the spring of eyeglasses.

The invention consists of a nose-piece having several points of attachment to the lens or bow, and having also a socket for the reception of an end of the spring.

Figure 1:
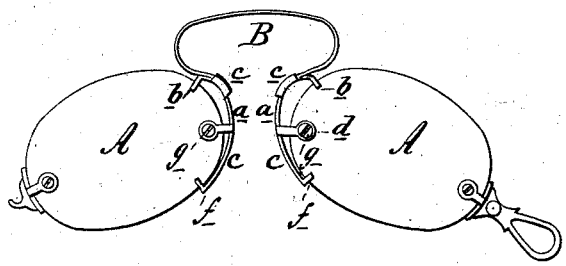
Figure 2:
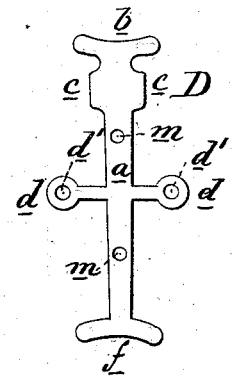

Figure 1 is a front elevation of an eyeglass with the device attached. Fig. 2 is an enlarged vertical elevation of the nose-piece blank.

Similar letters of reference indicate corresponding parts.

In the drawings, A A represent the lenses, B the spring, and C C the nose-pieces connecting the said lenses A A and spring B.

A nose-piece, C, is formed from the metal blank D, which is a flat strip of metal of the general form of a cross, with like and opposite projections from either side, of which *a* represents the long upright central standard, and *b* the top cross-piece—whose upper edge is made concave, as shown—that forms the upper clip of the nose-piece C, and serves also as a post to hold the spring B from the edge of the lens A. Below the cross-piece *b* are the short lateral projections *c c*, that form the cap of the device, and below the projections *c c* are the longer lateral arms *d d*, having holes *d' d'* made in their enlarged ends, that are designed as the mountings of the device, while at the bottom of the standard *a* is a cross-piece, *f*, whose lower edge is made concave, as shown.

In applying this device the standard *a* is bent flatwise, so as to conform in a measure with the inner end of the lens A. The ends of the cross-piece *b* are bent inward at right angles to the standard *a* and made to grasp the lens A at the top of its inner end, as shown in Fig. 1. The projections *c c* are bent outward and upward to form the cap or socket into which the end of the spring B is entered and held, as shown. The lateral arms *d d* are bent inward and made to grasp the inner end of the lens A, and form what is termed the "mounting" of the device, which mounting is secured to the lens A by means of screw or rivet *g*, that passes through the holes *d' d'* and the lens A itself. The lower cross-piece, *f*, is also bent inward and made to grasp the edge of said lens A, thus forming the lower clip of the nose-piece. The holes *m m* in the standard *a* are designed for the pins securing the usual nose-rest.

Ordinarily the nose-piece is attached to an eyeglass-lens at one point only and by a rivet or screw; hence such lenses are apt to work loose, and thereby constantly change the positions of their focal points, and such lenses readily break under slight strain at or near the point of attachment, while with this device it is found that the three points of connection between the nose-piece and lens afford so extended a bearing that the lens is held immovably, and is not affected by a strain that will fracture a lens with but the usual single point of connection.

This device may be applied not only directly to the lens, as herein shown, but also to the bow of an eyeglass, and, being constructed of one piece of metal, is stronger and more durable than any eyeglass nose-piece of the usual construction.

Having thus described my invention, what I claim as new, and desire to secure by Letters Patent, is—

1. An eyeglass nose-piece constructed substantially as herein shown and described, consisting of curved standard *a*, inwardly-bent upper clip, *b*, outwardly-bent cap or socket *c*, inwardly-bent mountings *d*, and inwardly-bent lower clip, *f*, as set forth.

2. A nose-piece blank, D, for eyeglasses, consisting of standard *a*, curved cross-piece *b*, lateral projections *c c*, arms *d d*, and lower cross-piece, *f*, substantially as herein shown and described.

WILLIAM J. SUTTIE.

Witnesses:
 I. I. STORER,
 C. SEDGWICK.